United States Patent [19]

Leaf

[11] Patent Number: 5,754,772
[45] Date of Patent: May 19, 1998

[54] TRANSACTION SERVICE INDEPENDENT HTTP SERVER-TO-TRANSACTION GATEWAY

[75] Inventor: Shawn T. Leaf, St. Paul, Minn.

[73] Assignee: Unisys Corporation, Blue Bell, Pa.

[21] Appl. No.: 622,099

[22] Filed: Mar. 26, 1996

[51] Int. Cl.$^6$ .................................................. G06F 15/16
[52] U.S. Cl. ................................ 395/200.33; 395/610
[58] Field of Search ............................ 395/604, 610, 395/762, 335, 200.03, 200.09, 200.12, 200.33, 200.31, 200.47, 200.97

[56] References Cited

U.S. PATENT DOCUMENTS

| | | | |
|---|---|---|---|
| 4,774,655 | 9/1988 | Kollin et al. | 395/604 |
| 4,881,166 | 11/1989 | Thompson et al. | 395/608 |
| 5,129,082 | 7/1992 | Tirfing et al. | 395/600 |
| 5,428,776 | 6/1995 | Rothfiled | 395/600 |
| 5,530,852 | 6/1996 | Meske, Jr. et al | 395/610 |
| 5,572,643 | 11/1996 | Judson | 395/793 |
| 5,596,744 | 1/1997 | Dao et al. | 395/610 |
| 5,623,656 | 4/1997 | Lyons | 395/610 |
| 5,634,053 | 5/1997 | Noble et al. | 395/604 |

OTHER PUBLICATIONS

Francis Heylighen, World–Wide Web: a distributed hypermedia paradigm for global networking, Apr. 18, 1994, IEE/INSPEC Database Updates and Additions (1960-95) doc. # 1374618; Proceedings. Share Europe Spring Conference pp. 355-368., 1994.

Primary Examiner—Lance Leonard Barry, Esq.
Attorney, Agent, or Firm—Charles A. Johnson; Mark T. Starr

[57] ABSTRACT

A system which makes prior art On-Line Transaction Processing (OLTP) systems and their associated databases accessible using HyperText Transport Protocol (HTTP) interfaces. The response time for an on-line user seeking HTTP access to the transaction processing system is minimized by pre-establishing a transaction gateway client having a static connection to the transaction processing system. In addition, the HTTP access to the transaction processing system is available for multiple concurrent users. The system further provides a gateway that is independent of the underlying service provided by the transaction processor, whereby the same gateway client is capable of usage with different databases and operations thereon.

36 Claims, 12 Drawing Sheets

HTML TEMPLATE
314

```
<FORM METHOD=GET ACTION="/RT68/EMPDBSVC.tx'>
<INPUT TYPE=HIDDEN NAME="View" VALUE="EMP_BUF">
<TABLE>
<TR>
    < TD ROWSPAN=10>
        <IMG SRC="/Images/WebTx5.gif" WIDTTH=67 HEIGHT=318
VSPACE=0 HSPACE=15>
    <TD>
        Employee #
    <TD COLSPAN=2>
        <INPUT SIZE=5 MAXLENGTH=4 NAME=NUMBER VALUE=" ">
    <TD ALIGN=RIGHT COLSPAN=2>
        <INPUT TYPE=reset VALUE="Clear Form">

<TR>
    <TD COLSPAN=5>
        <HR SIZE=2>
<TR>
    <TD COLSPAN=5 ALIGN=CENTER>
        <B>Employee Information</B>
<TR>
    <TD> Name
    <TD><INPUT SIZE=11 MAXLENGTH=10 NAME=NAME VALUE=" ">
    <TD WIDTH=25>
    <TD>Job
    <TD><INPUT SIZE=10 MAXLENGTH=9 NAME=JOB VALUE=" ">
<TR>
    <TD>
    Operation
    <TD>
        <SELECT NAME=COMMAND><OPTION
SELECTED>Select<OPTION>Update<OPTION>Insert<OPTION>Delete</S
ELECT>
<TR>
    <TD>
        <I>Status</I>
    <TD COLSPAN=3>
        <INPUT SIZE=27 MAXLENGTH=1 NAME=STATUS VALUE=" ">
    <TD ALIGN=RIGHT>
        <INPUT TYPE=SUBMIT VALUE=Transmit>
</TABLE>
</FORM>
```

*Figure 7*

VIEW DEFINITION
316

```
VIEW EMP_BUF
 # type        cname       fbname       count   flag    size    null
 #..........   ..........  ...........  ......  ......  ......  ......
   carray      status      STATUS       1       -       40      " "
   carray      command     COMMAND      1       -       7       " "
   carray      Number      NUMBER       1       -       5       " "
   carray      Name        NAME         1       -       11      " "
   carray      Job         JOB          1       -       10      " "
   carray      Mgr         MGR          1       -       5       " "
   carray      HireDate    HIREDATE     1       -       10      " "
   carray      Salary      SALARY       1       -       6       " "
   carray      Comm        COMM         1       -       6       " "
   carray      Dept        DEPT         1       -       5       " ".
END
```

*Figure 8*

TRANSACTION SERVICE INDEPENDENT HTTP SERVER-TO-TRANSACTION GATEWAY

BACKGROUND

1. Field of the Invention

This invention generally relates to gateway processors for providing access to database management systems by browser programs, and more particularly to a generalized gateway processor for making various transaction databases accessible by browser programs.

2. Description of the Related Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the Web Browser. Web Browsers are quickly becoming a de facto user interface standard because of their ability to interpret and display information having standard formats (e.g., HyperText Markup Language (HTML), standard text, GIF, etc.). Client software programs, popularly referred to as Web Browsers (e.g., Mosaic, Lynx, etc.), execute on client systems and issue requests to server systems. The server systems typically execute HyperText Transport Protocol (HTTP) server programs which process requests from the Web Browsers and deliver data to them. The system that executes a HTTP server program and returns data to the Web Browser will hereinafter be referred to as a Web Server System. An HTTP server program itself will be referred to as Web Server.

A Web Server System has access to on-line documents that contain data written in HyperText Markup Language (HTML). The HTML documents contain display parameters, capable of interpretation by a Web Browser, and references to other HTML documents and Web Servers (Source: *World Wide Web: Beneath the Surf*, from UCL Press, by Mark Handley and Jon Crowcroft, on-line at http://www.cs.ucl.ac.uk/staff/jon/book/book.html).

As Web Browsers are making their mark as a "standard" user interface, many businesses have a wealth of information that is managed by prior art database management systems such as DMS, RDMS, DB2, Oracle, Ingres, Sybase, Informix, and many others. In addition, many of the database management systems are available as resources in a larger transaction processing system.

One key to the future success of a business may lie in its ability to capitalize on the growing prevalence of Web Browsers in combination with selectively providing access to the data that is stored in its databases. Common Gateway Interface programs are used to provide Web Browser access to such databases.

The Common Gateway Interface (CGI) is a standard for interfacing external applications, such as Web Browsers, to obtain information from information servers, such as Web Servers. The CGI allows programs (CGI programs) to be referenced by a Web Browser and executed on the Web Server system. For example, to make a UNIX database accessible via the World Wide Web, a CGI program is executed on the Web Server system to transmit information to the database engine, receive the results from the database engine, and format the data in an HTML document which is returned to the Web Browser.

A disadvantage with the CGI program approach described above is that the application developer must be acquainted with the HTML, the CGI, and the database engine. In addition, a different CGI program may be required for each different database, thus adding to the cost of creating and maintaining the database access for the Web Browser.

Businesses are faced with the challenge of adapting their present usage of yesterday's technology to new opportunities that are made available with the World Wide Web. Most business application software and underlying databases are not equipped to handle interaction with Web Browsers. It would therefore be desirable to have a flexible and efficient means for allowing interoperability between business application software and the World Wide Web.

SUMMARY OF THE INVENTION

The present invention makes prior art on-line transaction processing (OLTP) systems and their associated databases accessible using HyperText Transport Protocol (HTTP) interfaces. The response time for an on-line user seeking HTTP access to the transaction processing system is minimized by pre-establishing a transaction gateway client having a static connection to the transaction processing system. In addition, the HTTP access to the transaction processing system is available for multiple concurrent users. The invention further provides a gateway that is independent of the underlying service provided by the transaction processing system, whereby the same gateway client is capable of usage with different databases and operations thereon.

An on-line transaction processing system is made accessible to Web Browsers by establishing a predetermined plurality of transaction gateway clients to receive HTTP requests that are received by a Web Server from the Web Browsers. Concurrent processing of multiple transaction requests from the Web Browsers is performed by the plurality of transaction gateway clients. Each transaction gateway client pre-establishes a static connection with the on-line transaction processing system. The pre-established connection allows requests from the Web Browsers to be quickly routed to the transaction processing system. Time is saved by elimination of the traditional steps of connecting with and then disconnecting from the transaction processing system for each request from a browser program. The gateway client translates between HTTP formatted requests from the Web Browsers and the request format expected by the on-line transaction processing system.

The invention handles multiple concurrent requests from the Web Browsers and makes the requests available for concurrent processing by the on-line transaction processing system. A predetermined number of instances of the transaction gateway client are established to be available for performing the necessary translations. Each of the instances of the transaction gateway client establishes a static connection with the on-line transaction processing system as described above. As requests are received by the Web Server from the Web Browsers, the requests are routed to an available one of the instances of the transaction gateway client. Each instance of the transaction gateway client is capable of processing one request at a time.

The transaction gateway client of the present invention is independent of the underlying service initiated by the on-line transaction processing system. For example, the transaction gateway client may be utilized with different database managers (the database manager being the service), so long as the on-line transaction processing system is capable of utilizing the services provided by the different database managers. Multiple styles of transaction gateway clients may be established, however, to interface with different styles of on-line transaction processing systems and to accommodate differences in data format requirements.

The independence of the transaction gateway client from the underlying service is accomplished with each HTTP request from a Web Browser program specifying a requested service and a respective predetermined mapping file for each available service. A predetermined HyperText Markup Language (HTML) template file is also established for each desired service. Each of the predetermined mapping files sets forth the format and content of the data buffer that is used for communicating between the transaction gateway client and the on-line transaction processing system for the particular service. A mapping file directs the transaction gateway client where to write data to and read data from the data buffer for predetermined fields of the database. The HTML template file is used in creating an HTML document that is returned to a Web Browser. The transaction gateway client reads data values from a data buffer returned from the transaction processing system (as specified by the mapping file), the data values are written to appropriate locations in the HTML document as directed by information contained in the HTML template file.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7 illustrates a portion of the HTML Template created for the View Definition of FIG. 8;

FIG. 8 illustrates a sample View Definition;

DETAILED DESCRIPTION

Figure 1:
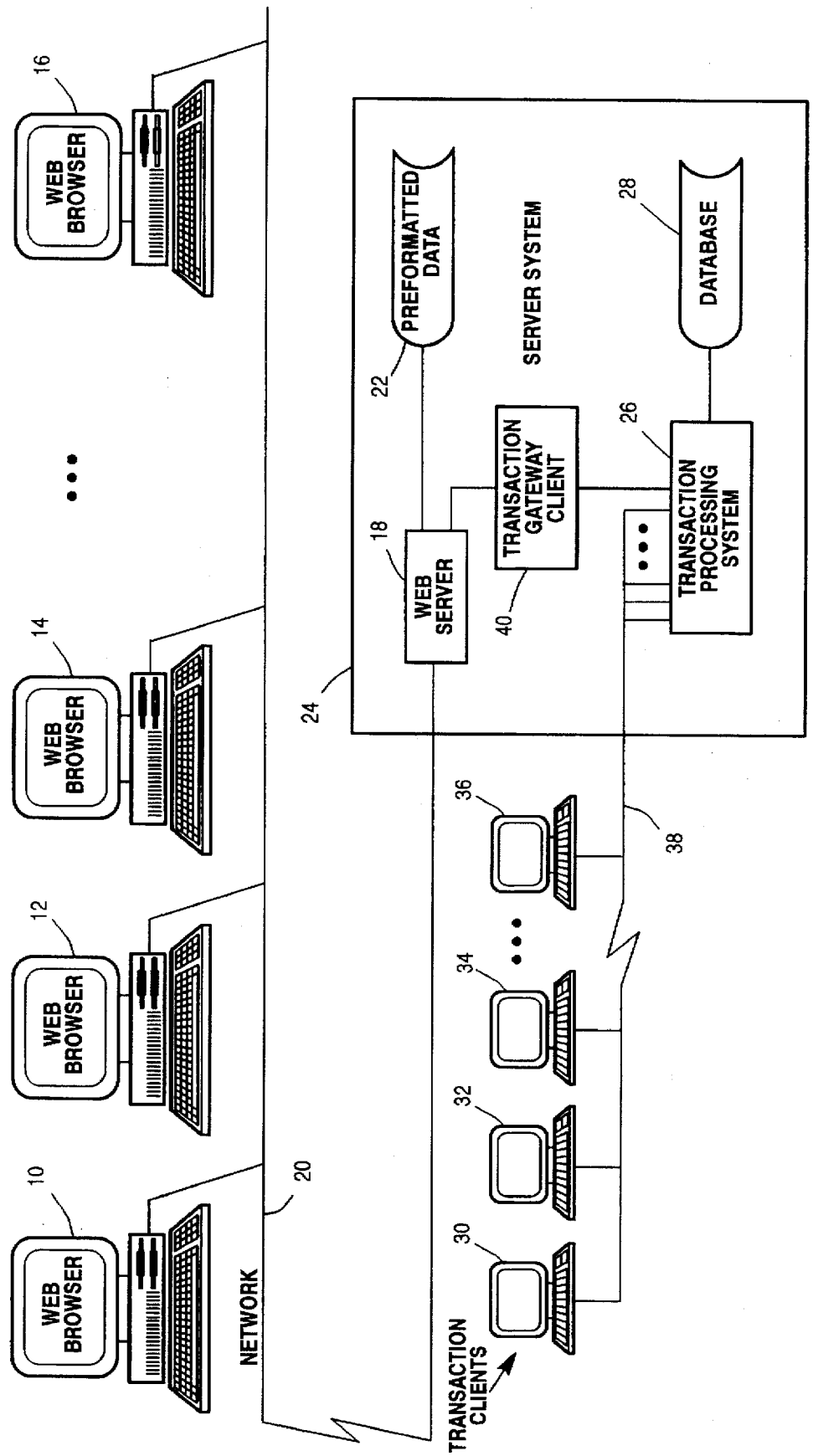
FIG. 1 is a functional block diagram of a computing environment in which a transaction system and a Web Server interoperate in a single system.
Figure 2:
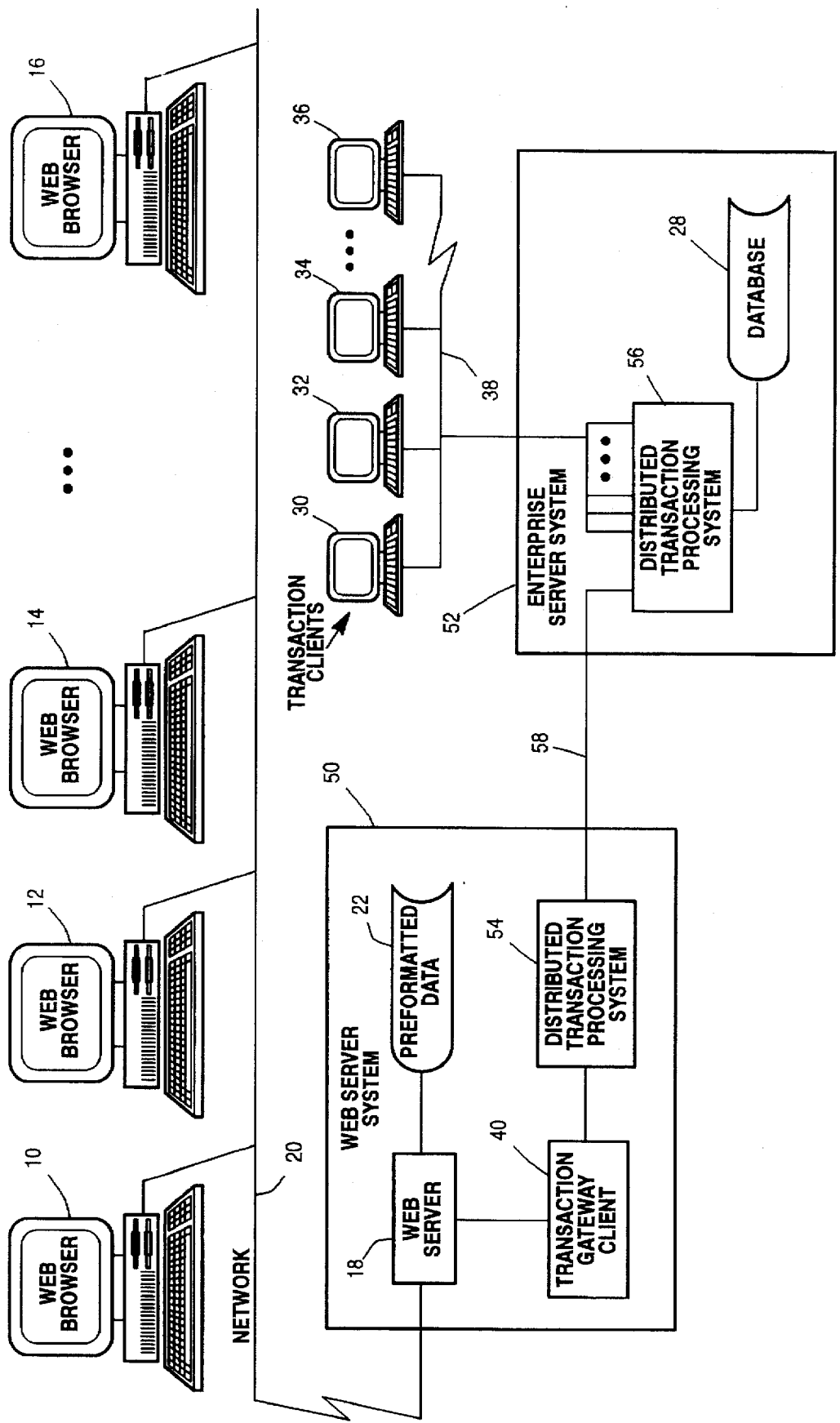
FIG. 2 is a functional block diagram of an exemplary computing environment in which the present invention could be used.

FIGS. 1 and 2 are functional block diagrams of exemplary computing environments in which the present invention could be used to make a transaction processing system interoperable with the World Wide Web. FIG. 1 is a functional block diagram of an environment in which the transaction system and the Web Server operate in a single system, and FIG. 2 shows an environment in which the Web Server System acts as a front-end for the Enterprise Server System.

FIG. 1 is a functional block diagram of a computing environment in which a transaction system and a Web Server interoperate in a single system. A plurality of microcomputers, designated as Web Browser 10, 12, 14, and 16, are coupled to a Web Server 18 via Network 20. The Network may be an internal local area network or the Internet.

Each of the Web Browsers 10–16 is comprised of software for browsing the World Wide Web, such as Mosaic, Netscape Navigator, etc., and a suitable micro-computer or computer workstation along with operating system software. The Web Server may be off-the-shelf software such as the Microsoft Internet Information Server and Netscape Commerce Server.

The typical operating mode for the Web Server 18 is to receive requests from the Web Browsers 10–16 and return the requested data from the Pre-formatted Data element 22. The Pre-formatted Data consists of HTML documents.

The Server System 24 may be any data processing system that is suitable for transaction processing applications, such as the 2200 Series, A-Series, and UNIX based data processing systems from Unisys Corporation. The exemplary Transaction Processing System 26 is intended to encompass transaction manager software, such as Open/OLTP Transaction Manager software from Unisys, user implemented Open/OLTP services (application programs), and Open/OLTP resource managers (such as a database management system). The Open/OLTP transaction model is described in the *X/Open Guide, Distributed Transaction Processing Reference Model* as published by the X/Open Company Ltd., U.K. The present invention would be applicable to other non-standard or proprietary transaction based systems, as well as to other data servers in general.

The Transaction Processing System 26 serves data from the Database 28 to the Transaction Clients 30, 32, 34, and 36. The Transaction Clients 30–36 are coupled to the Transaction Processing System via Line 38, of which the underlying technology is driven by the application of the Transaction Processing System 26.

The Transaction Gateway Client 40 allows the Web Server 18 to interoperate with the Transaction Processing System 26. Specifically, a predetermined Open/OLTP service, as defined by an application programmer, is referenced in an HTML document in the Pre-formatted Data element 22. When a Web Browser 10, 12, 14, or 16 selects the service, the request is routed to the Web Server 18, which in turn routes the request to the Transaction Gateway Client. The Transaction Gateway Client determines the requested service and forwards the necessary information to the Transaction Processing System 26. The Transaction Processing System processes the request against the Database 28 according to the specified request (e.g., select, update, delete). The Transaction Processing System returns data and/or status information to the Transaction Gateway Client, which in turn formats the data into an HTML document that is forwarded to the Web Server. The Web Server sends the HTML document to the requesting Web Browser.

FIG. 2 is a functional block diagram of an exemplary computing environment in which the present invention could be used. The environment of FIG. 2 differs from that of FIG. 1 in that the Web Server 18 and the Database 28 reside on separate data processing systems. The Web Server 18 resides on a Web Server System 50, and the Database 28 resides on an Enterprise Server System 52.

The Web Server System 50 may be any class machine that is capable of running a Web Server 18 along with a Distributed Transaction Processor 54. In the exemplary Web Server System, the Distributed Transaction Processing System 54 is similar to the Transaction Processing System 26 of FIG. 1 in that both are Open/OLTP compatible. The Transaction Processing System 54 of FIG. 2 is designated as Distributed to make clear that a transaction is formatted on the Web Server System 50 and forwarded to the Enterprise Server System for processing. A suitable Distributed Transaction Processing System 54 for the Web Server System is the Transactional Desktop software product from Unisys. The Transactional Desktop software is Open/OLTP compliant, but does not have the required components for processing service requests. However, the Transactional Desktop software is capable of initiating service requests.

The exemplary Enterprise Server System is a 2200 Series data processing system from Unisys and also includes a Distributed Transaction Processing System 56. The Distributed Transaction Processing System 56 is intended to encompass the same functionality as the Transaction Processing System 26. However, it is designated as Distributed to be compatible with the Distributed Transaction Processing System 54. The Distributed Transaction Processing System 54 and the Distributed Transaction Processing System 56 are coupled via Network 58. Preferably, the network interface for Network 58 is separate from the network interface for Network 20.

The environment of FIG. 2 may be preferable to the environment of FIG. 1 in that the Web Server System 50 maybe used prevent request from the Web Browsers 10–16 from entering Network 58. The Windows NT operating system is configurable to prevent routing of data packets between two network interfaces. In this fashion, the only traffic that is allowed on Network 58 in response to requests on Network 20 is in the form of Open/OLTP service calls which are referenced by HTML documents.

Figure 3:
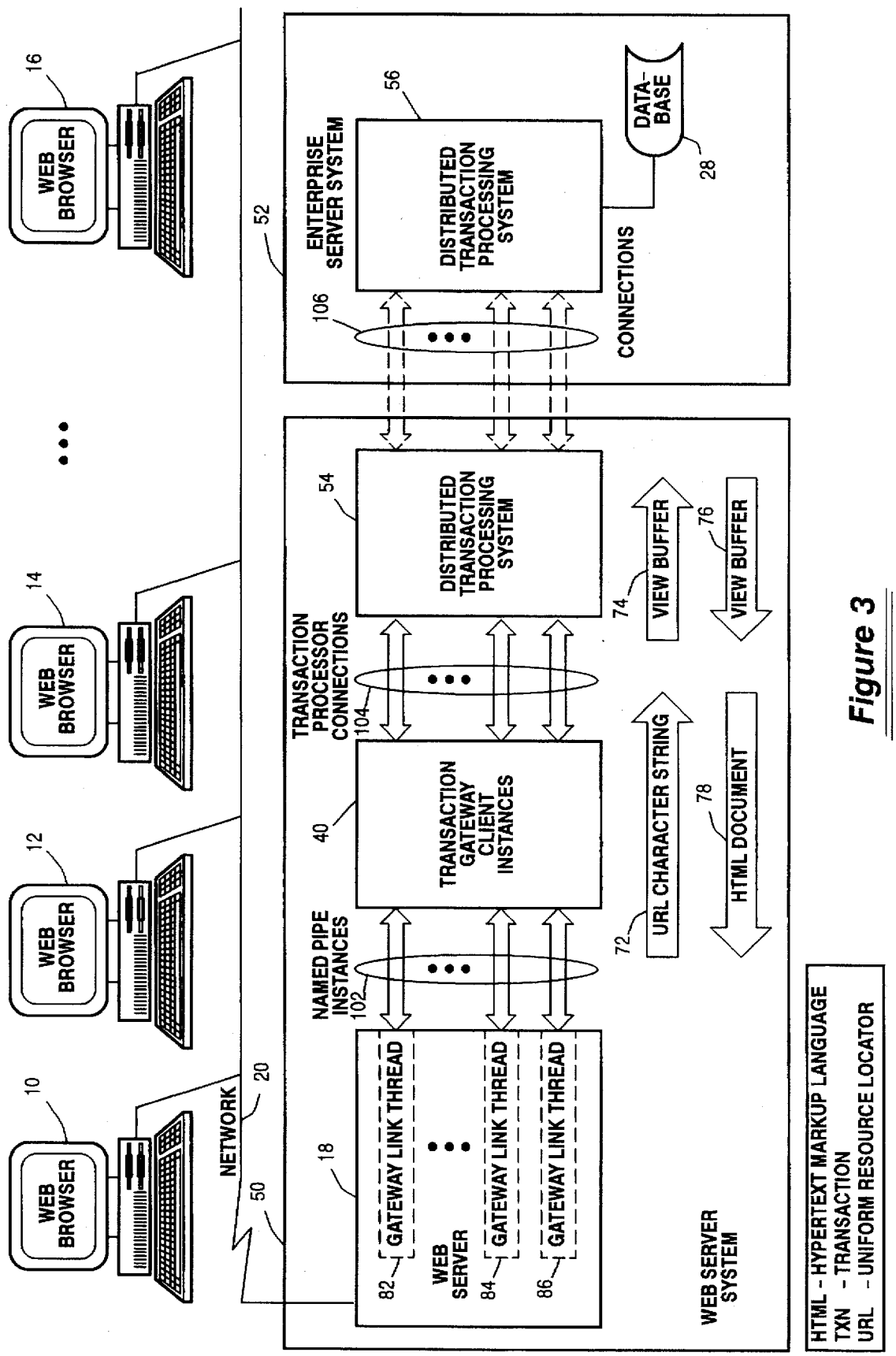
FIG. 3 is a functional block diagram of the software components that make a transaction database accessible to one or more Web Browsers.

FIG. 3 is a functional block diagram of the software components that make a transaction database accessible to one or more Web Browsers. Before discussing the various software components, it may be useful to illustrate a high level data flow between the components.

The data flow is illustrated by the labeled directional arrows 72, 74, 76, and 78. The Web Server 18 receives Uniform Resource Locator (URL) character strings from the Web Browsers 10, 12, 14, and 16. URL character strings are passed to the Transaction Gateway Client instances 40, which in turn translate the URL character strings into View Buffers. View Buffers are passed to the Distributed Transaction Processing System 54 as shown by Line 74, and in turn passed on to the Distributed Transaction Processing System 56. Note that a View Bohfer is a data structure that is understood by the Open/OLTP style Distributed Transaction Processing Systems 54 and 56. The invention would be equally applicable to transaction and/or database systems which expect different data structures. The Distributed Transaction Processing System 56 returns View Buffers to the Distributed Transaction Processing System 54, which in turn returns View Buffers to the Transaction Gateway Client instances 40. The Transaction Gateway Client instances transform the View Buffers into HyperText Markup Language documents which are returned to the Web Server 18 as shown by Line 78. The Web Server returns the HTML documents to the respective Web Browsers.

In terms of the software components that make a transaction database Web Browser efficiently accessible, two main components provide the accessibility. The first component is the Gateway Link Thread 82 and the second is the Transaction Gateway Client 40.

Web Servers such as the Netscape Commerce Server support multiple threads. That is, a single Web Server process is multiplexed between the threads. In the exemplary embodiment, the Web Server software (i.e., Netscape Commerce Server) is configured with a Dynamic Link Library function designated as the Gateway Link. Each of the Gateway Link threads 82, 84, and 86 correspond to a URL received from a respective one of the Web Browsers 10–16. The basic function of a Gateway Link is to establish a connection with an available Transaction Gateway Client instance 40, forward a URL to the Transaction Gateway Client instance, receive an HTML document from the Transaction Gateway Client instance, and return the HTML document to the respective Web Browser. The Gateway Link threads are designated with dashed lines to indicate that their existence is dynamic.

The second main software component is the Transaction Gateway Client 40. The main function of the Transaction Gateway Client is to transform a request which is in the form of a URL from a Web Browser 10–16 into a format which is understandable by the Distributed Transaction Processing Systems 54 and 56, and transform the data returned from the Distributed Transaction Processing Systems 54 and 56 into a HTML document that is returned to a Gateway Link.

In the exemplary embodiment, a predetermined number of Transaction Gateway Client instances are started and available to process requests from the Web Browsers 10–16. Each of the Transaction Gateway Client instances processes one request at a time. An equally suitable approach would be to have one Transaction Gateway Process instance with a multi-thread capability.

Each of the Transaction Gateway Client instances creates an instance of a Named Pipe. The instances of the Named Pipe are collectively referenced as 102. An instance of the Named Pipe is used for communicating between one of the Gateway Link threads 82–86 and an available one of the Transaction Gateway Client instances.

In addition to instances of the Named Pipe 102, each instance of the Transaction Gateway Client 40 establishes a connection with the Distributed Transaction Processing System 54. This connection is established prior to a Transaction Gateway Client receiving a request from a Web Browser and maintained for the life of the processor instance so that time is not wasted in connecting and disconnecting every time a request appears. In the exemplary system the connection is made with the tpinit program call to the Distributed Transaction Processing System 54. In this manner, each of the Transaction Gateway Client instances has a preestablished and continuous connection with the Distributed Transaction Processing System 54. The connections between the Transaction Processing System Gateway instances and the Distributed Transaction Processing System are collectively referenced as 104.

Connections between the Distributed Transaction Processing Systems 54 and 56 are established as requests are forwarded from the Transaction Gateway Client instances.

The connections are collectively referenced as Lines 106. The connections are designated with dashed lines to indicate that the connections are dynamically established and undone (as compared to the static connections between the Transaction Gateway Client instances 40 and the Distributed Transaction Processor 54).

Figure 4:
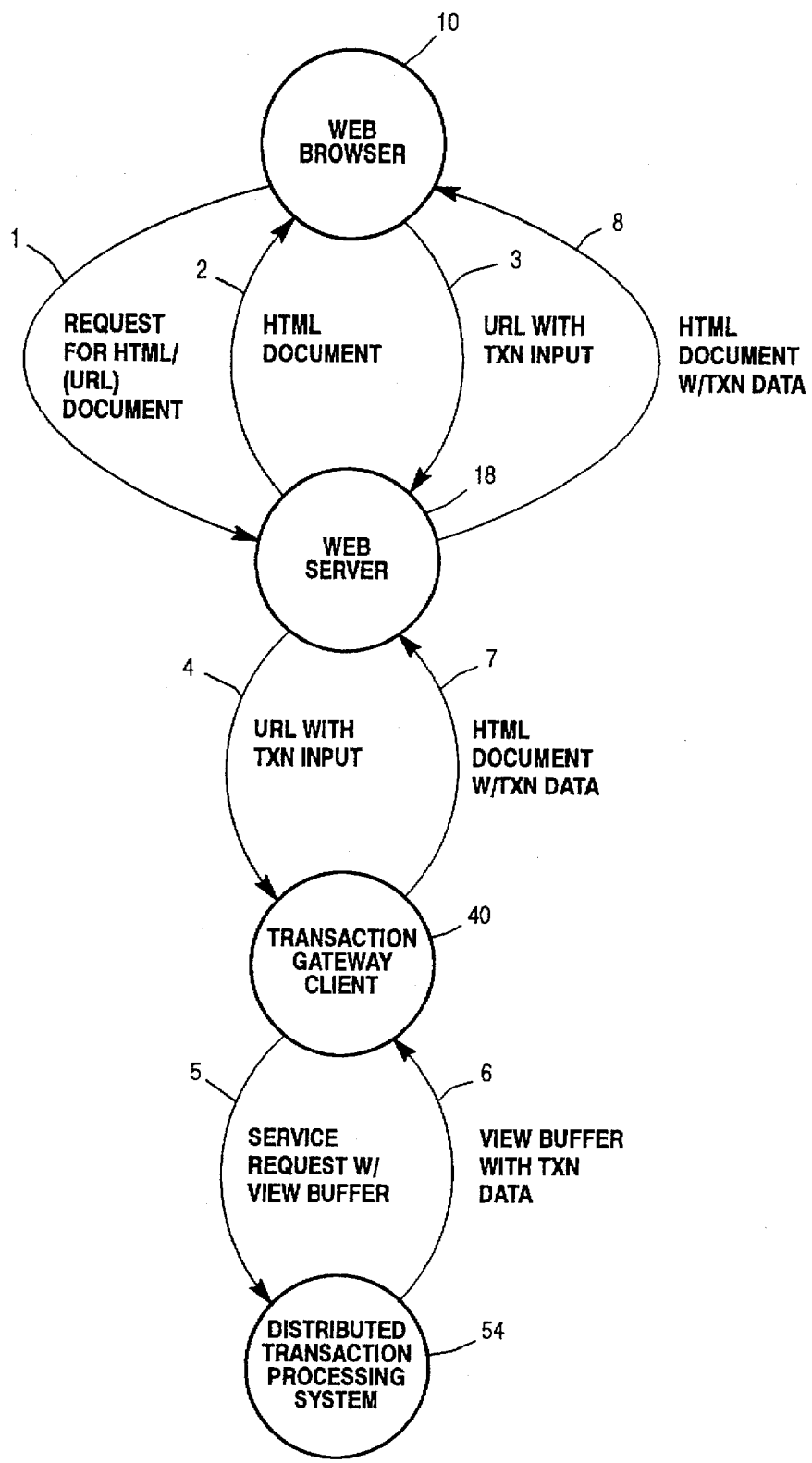
FIG. 4 is a dataflow diagram showing the flow of data between the components of the exemplary system.

FIG. 4 is a dataflow diagram showing the flow of data between the components of the exemplary system. Initially, the Web Browser 10 makes a request for an HTML document to the Web Server 18 in the form a URL character string as shown by Line 1. The Web Server then returns a predetermined HTML document to the Web Browser as shown by Line 2. The data flow of Lines 1 and 2 is intended to illustrate the initial steps for initiating a transaction from a Web Browser.

Line 3 shows the URL forwarded from the Web Browser 10 to the Web Server 18 in response to an action initiated by the user of the Web Browser. The Web Server, in turn, receives the URL and passes it along to the Transaction Gateway Client 40 as shown by Line 4. The Transaction Gateway Client 40 transforms the input URL into a View Buffer, which at Line 5, is passed to the Distributed Transaction Processing System 54.

The Distributed Transaction Processing System 54 forwards the View Buffer to the appropriate resource manager (not shown) and receives the results of processing the transaction in a View Buffer. The View Buffer with the transaction results is returned to the Transaction Gateway Client 40 as shown by Line 6. The Transaction Gateway Client extracts the transaction results from the View Buffer and inserts the transaction results into an HTML document. At Line 7, the HTML document with the transaction results is forwarded to the Web Server 18. The Web Server then transmits the HTML document with the transaction results to the Web Browser 10.

Figure 5:
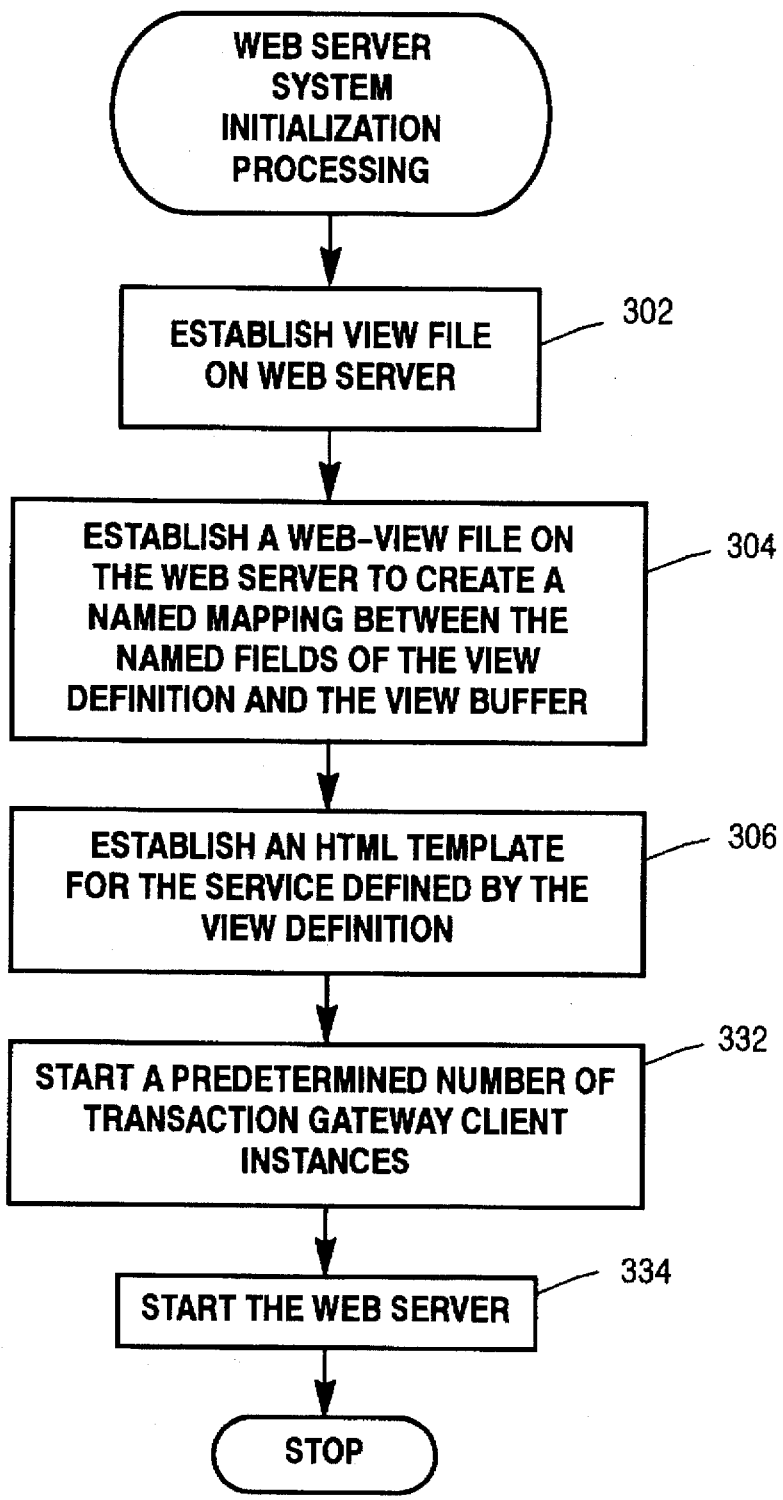
FIG. 5 is a flowchart of the steps for initializing an environment on a Web Server System to provide Web Browser access to a transaction database.

FIG. 5 is a flowchart of the steps for initializing an environment on a Web Server System 50 to provide Web Browser access to a transaction database.

Figure 6:
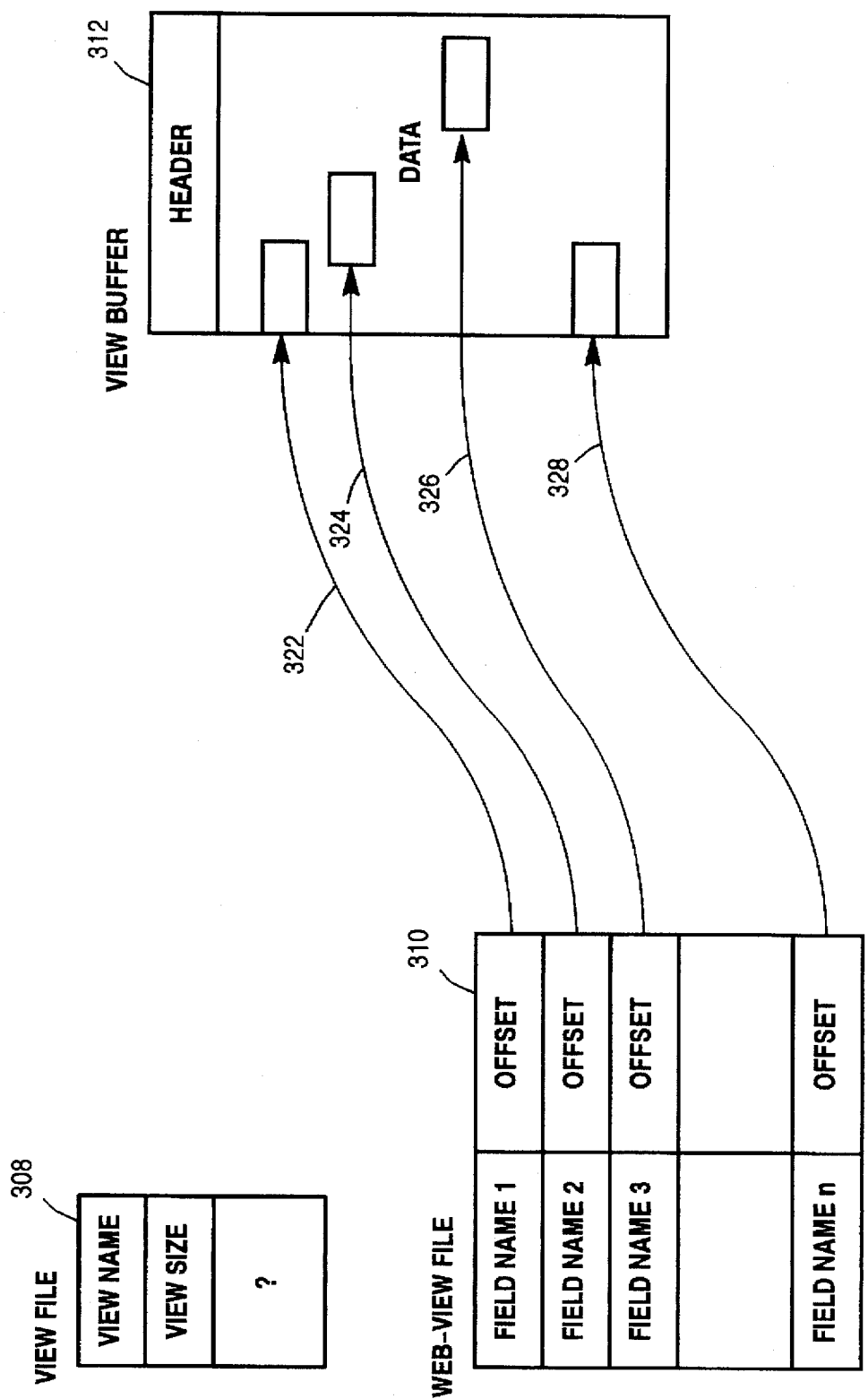
FIG. 6 shows the relationship between the Web-View File and the View Buffer.

A View File, a Web-View File, and an HTML Template are established on the Web Server System 50 at Steps 302, 304, and 306 respectively. FIG. 6 illustrates the content of a View File 308, a Web-View File 310, and a View Buffer 312. FIG. 7 illustrates a portion of an HTML Template 314.

The View File 308 is used by the Distributed Transaction Processing System 54 in allocating memory for a View Buffer 312, the contents of which is used in communicating with the Distributed Transaction Processing System 56. The View Buffer is an area of Web Server System memory that is used to store a data structure that contains data to be sent to the Distributed Transaction Processing System or that contains data received therefrom.

A View File contains a description of the fields that make up a data structure which is used by the transaction processing system service.

The exemplary Distributed Transaction Processing System 54 includes a software tool, referred to as the View Compiler, for establishing a View File 308 based on an input View Definition.

FIG. 8 illustrates a sample View Definition 316. A View Definition describes the data that may be input to or output from the Distributed Transaction Processing System 54. The sample View Definition contains selected fields of an employee database named EMP_BUF. The lines that begin with a "#" are comment lines and are not part of the definition. The designation carray describes a data type of an array of characters.

The second column of the View Definition 316 is headed by the identifier cname in the comment line. The names listed in this column are the corresponding names as they are referenced within a data structure in a C language or Visual Basic language program.

The third column of the View Definition is headed by the identifier fbname in the comment line. The names listed in this column are used in mapping fields named in the HTML Template 314.

The fourth column of the View Definition is headed by the identifier count in the comment line. The count is number of occurrences of the associated field.

The fifth column of the View Definition is headed by the identifier flag in the comment line. This field is not utilized in the present invention.

The sixth column of the View Definition is headed by the identifier size in the comment line. The size designates the number of bytes required in the View Buffer 312 for storage of the respective field when the size of the data type is variable.

The seventh column of the View Definition is headed by the identifier null in the comment line. The null values are the values that are stored in the View Buffer 312 if the field is not utilized in an HTML form.

At Step 304 of FIG. 5, a Web-View File 310 is established on the Web Server System 50. A Web-View File is created for each View File. The Web-View File contains a mapping between the database fields (fbname) named in the View Definition 316 and their respective positions in the View Buffer 312. A Web-View File is used in writing data to and extracting data from a View Buffer. The mappings defined in the Web-View File are dependent upon the specifications for an interface between application programs and the underlying database system. In the exemplary system, the mappings are governed by the Open/OLTP transaction processing interface. Those skilled in the art will recognize that mappings for other systems could be constructed according to the programming interface specifications.

FIG. 6 shows the relationship between the Web-View File 310 and the View Buffer 312. The Web-View File contains pairs of field names and offsets. The Field names correspond to the names in the fbname column of the View Definition 316. The respective paired offset indicates a byte offset into the View Buffer 312. The data for Field name 1 is at a location in the View Buffer as referenced by Line 322, the data for Field name 2 is at a location in the View Buffer as referenced by Line 324, the data for Field name 3 is at a location in the View Buffer as referenced by Line 326, and the data for Field name n is at a location in the View Buffer as referenced by Line 328.

At Step 306 of FIG. 5 an HTML Template is established on the Web Server System 50. An HTML Template is created for each View File. The HTML Template contains an HTML document that may be displayed by a Web Browser 10-16. The HTML Template may be viewed as a blank form. The Transaction Gateway Client 40 transfers data from a View Buffer 312 into an HTML document taking the form of the HTML Template. The HTML document is returned to the Web Browser.

FIG. 7 illustrates a portion of the HTML Template 314 created for the View Definition 316 of FIG. 8. The fbnames from the View Definition have place holders in the HTML Template for inserting data values, either by the Transaction Gateway Client 40 or by the user of the Web Browser. Note that the defined HTML Template may be used to display information to the user of a Web Browser as well as to solicit information from the user.

Returning to FIG. 5, at Step 332 a predetermined number of Gateway Client instances are started on the Web Server System 50. Step 334 starts the Web Server.

Figure 9:
FIG. 9 is a sample screen display of the image produced by a Web Browser from an HTML document based on the HTML Template.

FIG. 9 is a sample screen display of the image produced by a Web Browser from an HTML document based on the HTML Template 314. The HTML document displayed in FIG. 9 is the result of a exemplary scenario in which a blank form (e.g., the image of FIG. 9 without the employee data) is initially displayed by the Web Browser. The user then enters a number in the Employee # field of the form, specifies the Select Operation, and clicks on the Transmit button. The URL is constructed in the Location field of the Web Browser display.

The Uniform Resource Identifier (URI) is the subset of the URL that identifies the resource on the server. For example, for the URL:

http://wlvrne/RT68/EMPDBSVC.tx?View...

the URI is:

/RT68/EMPDBSVC.tx

The data after the "?" in the URL is the "query string" which contains input values.

The Web Server 18 optionally uses the first portion (/RT68/) of the URI to determine which gateway will process the request. Additionally, the Web Server optionally uses the last portion (.tx) to determine that the Gateway Link 82 should be invoked.

The Transaction Gateway Client 40 uses the middle portion (EMPDBSVC) to identify the Open/OLTP service routine to call, and the query string is used to identify the which View Buffer to use and which values to set. Note that the query string is only used with the 'GET' HTTP method, and contains data equivalent to the request content of an HTTP 'POST' method. The present invention allows both GET and POST HTTP methods.

Figure 10:
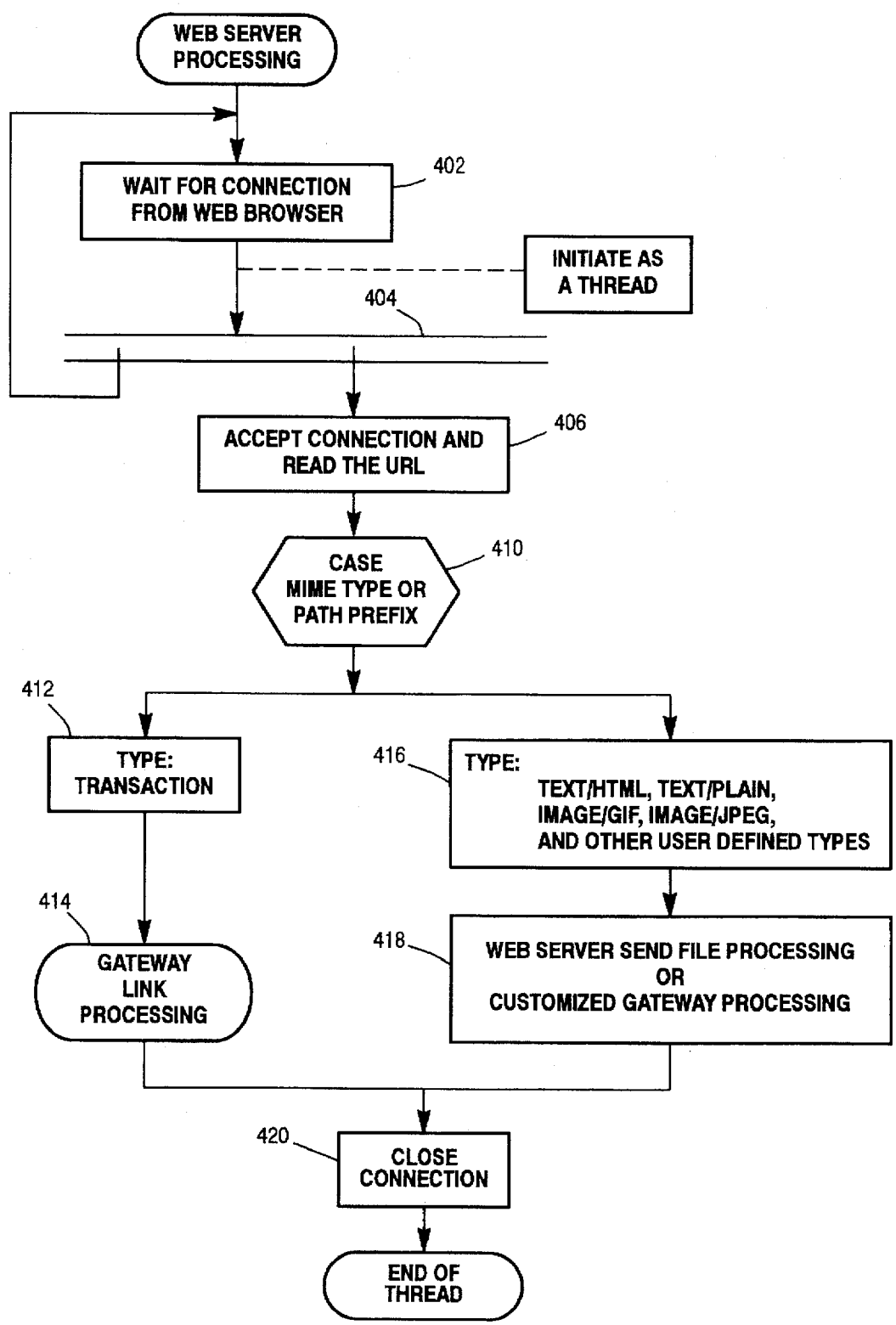
FIG. 10 is a flowchart of the general processing of the Web Server.

FIG. 10 is a flowchart of the general processing of the Web Server 18. At Step 402 the Web Server waits for a connection from a Web Browser 10-16. Once a connection is established, a thread is initiated to interact with the Web Browser as indicated by Line 404. The Web Server then returns to wait for connections from other Web Browsers and continues to Step 406 to process the request.

At Step 406, the connection with the Web Browser 10-16 is accepted and the URL that contains the request is read.

The processing to be performed for the request is dependent upon the Multipurpose Internet Mail Extension (MIME) type or the path prefix in the URL (e.g., "/RT68" from FIG. 9). The MIME type and path prefix may be used alone or in combination to activate predetermined gateway software. Customized MIME types and path prefixes are configurable with the Web Server 18. For example, a combination of the MIME type and usage of the path prefix may be configured so that all requests ending with ".tx" and beginning with "/XYZ/" go to one gateway, all requests ending with ".tx" and beginning with "/ABC/" go to a different gateway. The selection Step 410 directs which processing path is followed.

For a MIME type or path prefix dictating a transaction, as indicated by Block 412, Gateway Link Processing (FIG. 11) is initiated at Step 414. The Gateway Link Processing forwards the request to the Transaction Gateway Client 40, and returns to the Web Browser an HTML document that is constructed by the Transaction Gateway Client.

Other MIME types, as indicated by Block 416, include text/HTML, text/plain, image/gif, image/jpeg, and are usually handled by the Web Server's 18 "send-file" function or other customized gateway processing as shown by Step 418.

At Step 420, the connection with the Web Browser is closed to complete the thread.

Figure 11:
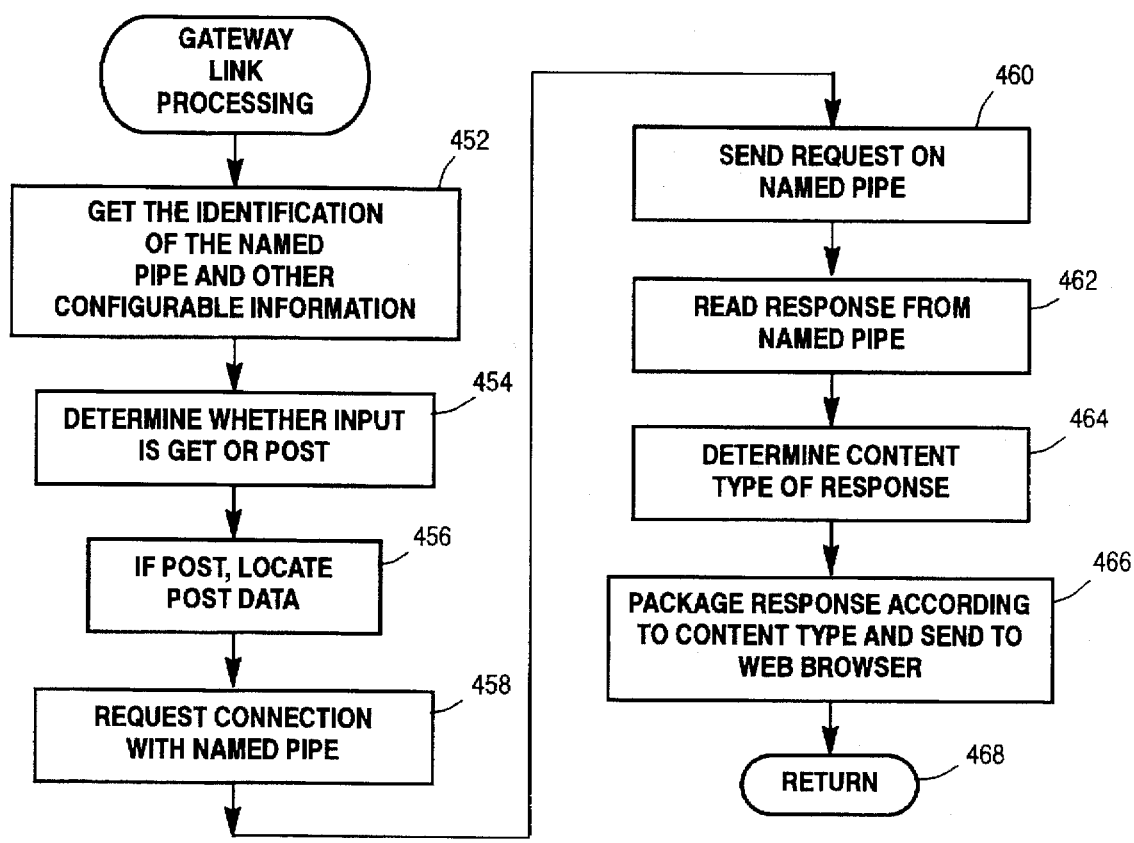
FIG. 11 is a flowchart of the processing performed by a Gateway Link thread.

FIG. 11 is a flowchart of the processing performed by a Gateway Link thread 82. A Gateway Link obtains a connection with an available instance of a Transaction Gateway Client 40, forwards the transaction request to the Transaction Gateway Client, receives from the Transaction Gateway Client an HTML document containing the transaction results, and returns the HTML document to the Web Browser.

At Step 452, the identification of the Named Pipe 102 is obtained from configuration information that is preestablished with the Web Server. Each instance of the Transaction Gateway Client 40 listening to an instance of the Named Pipe. Even though there are multiple instances of the Transaction Gateway Client, the pipe name is constant between all of these gateways. Any attempt by a Gateway Link to attach to this Named Pipe will result in exactly one of the instances of the Transaction Gateway Client accepting the connection and processing the request.

The other configuration data determines which request headers will be passed to the Transaction Gateway Client. Some options include authentication data, URI, document root, and Web Browser IP address.

GET and POST are the two methods used in the HTTP to transfer data contained in a HTML form (request input) to the Web Server 18. With GET, the input is available directly as part of the HTTP request. With POST, the input must be read from the Web Browser 10-16 over the TCP/IP socket connection. Step 454 determines which method by which the HTML data is to be obtained, and Step 456 obtains the HTML data via the TCP/IP socket connection.

At Step 458, a request is made to the operating system for a connection with an instance of the Named Pipe 102. In the exemplary embodiment, the Windows NT operating system provides the underlying software for management of the Named Pipe. If an instance of the Pipe is available, a connection is returned immediately. Otherwise, the operating system will wait for a programmable period of time for an instance to become available. If the period of time expires before a connection is available, an indicative status code is returned to the Gateway Link thread. The Gateway Link thread may then return an appropriate error message to the requesting Web Browser 10, 12, 14, or 16.

If a connection is made to the Pipe 102, Step 460 sends the URL to an instance of the Transaction Gateway Client 40. Step 462 then initiates a request to the operating system to read a response from the Pipe. The operating system suspends the thread processing until a response is available from the instance of the Transaction Gateway Process at the other end of the Pipe. The operating system returns an HTML document to the Gateway Link thread after the instance of the Transaction Gateway Process sends the HTML document.

The Gateway Link is not limited to HTML, and part of the response from the Transaction Gateway Client indicates the MIME type of the data being returned. The types include, but are not limited to, text/plain, text/html, image/gif, and image/jpg. Step 464 determines the type of data returned from the Transaction Gateway Client. The Gateway Link notifies the Web Browser 10-16 of the content type, and then sends the data at Step 466.

Step 468 returns control to the Web Server Processing of FIG. 10.

Figure 12:
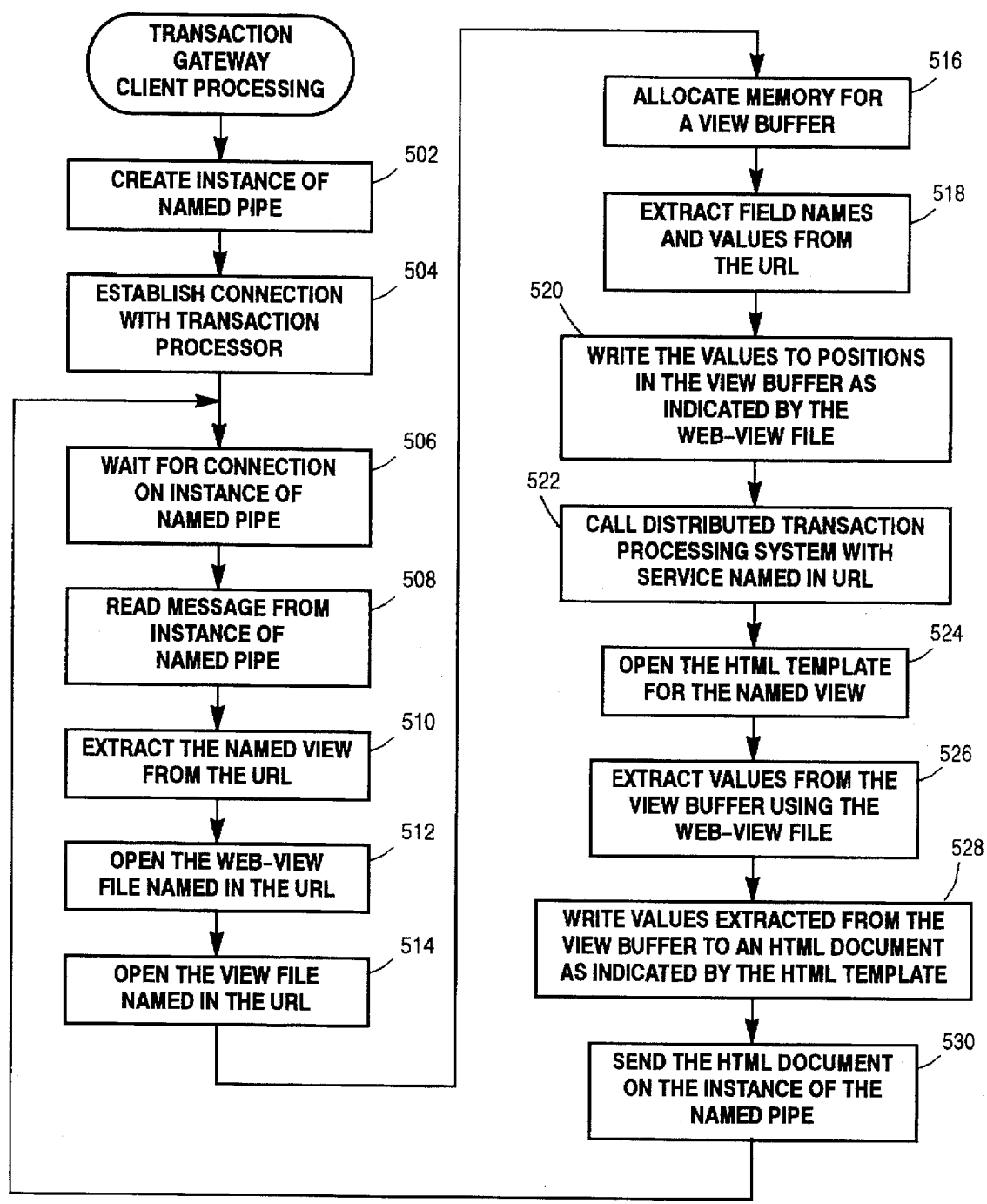
FIG. 12 is a flowchart of the processing performed by each of the instances of the Transaction Gateway Client.

FIG. 12 is a flowchart of the processing performed by each of the instances of the Transaction Gateway Client 40. Generally, the Transaction Gateway Client receives a URL that identifies a transaction, creates a View Buffer 312 to send to the Distributed Transaction Processing System 54, receives a View Buffer from the Distributed Transaction Processing System, and creates an HTML document which is then returned to the Gateway Link thread 82, 84, or 86.

Step 502 creates an instance of the Named Pipe 102. The name of the pipe is configurable and it must match the configuration name used by the Gateway Link 82–86 for the Web Server 18. Step 504 establishes a connection with the Distributed Transaction Processing System 54. The connection is maintained for the life of the instance of the Transaction Gateway Client. The pre-establishment and maintaining of the connection saves time in that the connection is always available. In OpenI/OLTP, the connection is made with a tpinit program call.

The instance of the Transaction Gateway Client waits for a connection on its instance of the Named Pipe 102 at Step 506. Step 508 reads a message from a Gateway Link thread 82, 84, or 86 after a connection is established on the Pipe instance.

The name of the View File 308 is extracted from the request at Step 510. In FIG. 9, the characters View=EMP_BUF in the Location field of the Web Browser screen specify the name of the View File. Step 512 opens the Web-View File 310 that is named by the View value, e.g., EMP_BUF. Similarly, Step 514 opens the View File named EMP_BUF.

Step 516 allocates memory for a View Buffer 312 based on the View Size indicated in the View File 308. The field names and their associated data values are extracted from the URL at Step 518. In FIG. 9, the NUMBER field has a data value of 7369 as illustrated in the Location field of the Web Browser display. As described above, the displayed HTML document of FIG. 9 with the displayed data values is a result of the Distributed Transaction Processing System 54 processing a Select operation on an employee database where the employee's NUMBER is 7369.

Step 520 writes the data value(s) which was extracted from the URL into the View Buffer. The location in the View Buffer is designated by the offset corresponding to the field name stored in the Web-View File 310.

Step 522 invokes the Distributed Transaction Processing System with the service specified in the URL (e.g., *EMP-DBSVC*.tx from the Location field of FIG. 9) along with the View Buffer 312. In the Open/OLTP model, a tpcall program call is used to initiate the service request.

When control is returned from the Distributed Transaction Processing System 54 to the Transaction Gateway Client 40, the HTML Template (e.g., 314) for the named View File 308 is opened at Step 524. Step 526 reads the values from the View Buffer 312. The Web-View File 310 is used to obtain the locations in the View Buffer of the fields named in the Web-View File. Once a data value of a field named in the Web-View File is read from the View Buffer, it may be written to an HTML document as indicated by Step 528. The writing of a data value to the proper location in the HTML document is accomplished with an HTML Template, e.g., 314.

At Step 530, the HTML document constructed at Step 528 is sent to the connected Gateway Link thread 82, 84, or 86 on the instance of the Named Pipe 102. Control is then returned to Step 506 to await another connection on the Pipe.

I claim:

1. In a data processing system having a HyperText Transport Protocol (HTTP) server for responding to requests from one or more external browser programs coupled to the HTTP server, a transaction processing system having transaction services for providing access to respectively coupled databases, wherein the transaction processing system processes transactions of a predetermined type and outputs transaction data in data structures having a predetermined format, an apparatus for receiving transaction requests and associated input transaction data from the browser programs and in response thereto, serving output transaction data to the browser programs, the apparatus comprising:

a predetermined number of transaction gateway clients, each coupled to said HTTP server and coupled to said transaction processing system and each being capable of translating a transaction request and associated input transaction data from a browser program into a predetermined transaction type to be processed by the transaction processing system, and each further being capable of translating results of the transaction request received from the transaction processing system into a predetermined format which is provided to the browser program as output transaction data.

2. The apparatus of claim 1, wherein said predetermined format for the browser program is hyper-text markup language.

3. The apparatus of claim 1, wherein each of said predetermined number of transaction gateway clients, is ready for processing prior to receipt of a request from a browser program.

4. The apparatus of claim 3, wherein said predetermined number of transaction gateway clients each have preestablished and static connections with the transaction processing system, whereby time associated with connecting a transaction gateway client to the transaction processing system to process a request from a browser program is eliminated.

5. The apparatus of claim 1, wherein the requests from the browser program are translated into On-Line Transaction Processing (Open/OLTP) style transactions.

6. The apparatus of claim 1, further comprising:

a variable number of dynamically initiated gateway link threads resident on the HTTP server, each for connecting with an available one of said predetermined number of transaction gateway clients in response to a request from a browser program.

7. In a data processing system having a HyperText Transport Protocol (HTTP) server for responding to requests from one or more external browser programs coupled to the HTTP server, a transaction processing system having transaction services for providing access to respectively coupled databases, wherein the transaction processing system processes transactions of a predetermined type and in response thereto, provides transaction data in data structures having a predetermined formats, a method for providing a HTTP interface to the transaction processing system, comprising the steps of:

(a) translating a request and request data received from a browser program into a transaction of a predetermined type;

(b) initiating the transaction processing system to process said transaction of said predetermined type;

(c) translating the transaction data received from the transaction processing system into a predetermined format for the browser program; and (d) returning the transaction data from said translating step to the HTTP server for returning to the browser programs.

8. The method of claim 7, further comprising the step of:

pre-establishing a predetermined number of transaction gateway clients, each for performing steps (a)–(d) for a respective request from a browser program, whereby each said client is ready for processing prior to receipt of a request from a browser program.

9. The method of claim 8, wherein said predetermined format for the browser program is hyper-text markup language.

10. The method of claim 9, wherein the requests from the browser program are translated into On-Line Transaction Processing (Open/OLTP) style transactions.

11. The method of claim 8, further comprising the step of pre-establishing static connections between said predetermined number of transaction gateway clients and the transaction processing system, whereby time associated with connecting one of said predetermined number of transaction gateway clients to the transaction processing system to process a request from a browser program is eliminated.

12. The method of claim 11, further comprising the step of dynamically initiating gateway link threads by the HTTP server in response to requests from browser programs, each for connecting with an available one of said predetermined number of transaction gateway clients and transferring a request to said available one of said predetermined number of transaction gateway clients.

13. In a data processing system having a HyperText Transport Protocol (HTTP) server for responding to requests from one or more external browser programs coupled to the HTTP server, a transaction processing system having transaction services for providing access to respectively coupled databases, wherein the transaction processing system processes transactions of a predetermined type and in response thereto provides transaction data in data structures having a predetermined formats, an apparatus for providing a HTTP interface to the transaction processing system, comprising:

means for translating a request from a browser program to a transaction of a predetermined type;

means for initiating processing by the transaction processing system of said transaction of said predetermined type;

means for receiving the transaction data from the transaction processing system in response to processing said transaction, and for further translating the transaction data into a predetermined format for the browser program; and means for returning the transaction data from said translating step to the HTTP server for returning to the browser programs.

14. The apparatus of claim 13, further comprising:

means for pre-establishing one or more transaction gateway clients, each for performing steps (a)–(d) for a respective request from a browser program, whereby each said client is ready for processing prior to receipt of a request from a browser program.

15. The apparatus of claim 14, wherein said predetermined format for the browser program is hyper-text markup language.

16. The apparatus of claim 15, wherein the requests from the browser program are translated into Open/OLTP style transactions.

17. The apparatus of claim 14, further comprising means for pre-establishing static connections between said one or more transaction gateway clients and the transaction processing system, whereby time associated with connecting a transaction gateway client to the transaction processing system to process a request from a browser program is eliminated.

18. The apparatus of claim 17, further comprising means for dynamically initiating gateway link threads by the HTTP server in response to requests from browser programs, each for connecting with an available one of said one or more transaction gateway clients and transferring a request to said available one of said one or more transaction gateway clients.

19. In a data processing system having a HyperText Transport Protocol (HTTP) server for responding to requests from external browser programs, a transaction processing system having transaction services for providing access to respectively coupled databases, each service capable of respectively performing selectable predetermined functions, wherein function requests and function results are communicated in buffers having predetermined formats, a method for providing a HTTP interface to a transaction processing system, comprising the steps of:

(a) reading a service name, a function name, a command field name, data field names, and associated values from a request from a browser program;

(b) allocating memory for a buffer;

(c) writing at predetermined locations in said buffer said values which were read from the browser request;

(d) initiating the transaction processing system with said service name and the buffer; upon receiving in the buffer a transaction response from the transaction processing system, performing steps (e)–(h);

(e) reading values of the data field names from the buffer;

(f) creating an HTML document having a predetermined format;

(g) writing to said HTML document said values from step (a) at predetermined locations; and (h) transferring the HTML document to the HTTP server.

20. The method of claim 19, further comprising the step of pre-establishing a predetermined plurality of transaction gateway clients, each for performing steps (a)–(h) for a respective request from a browser program, whereby each said client is ready for processing prior to receipt of a request from a browser program.

21. The method of claim 20, further comprising the step of dynamically initiating gateway like threads by the HTTP server in response to requests from browser programs, each for connecting with an available one of said transaction gateway clients and transferring a request to said available one of said transaction gateway clients.

22. In a data processing system having a HyperText Transport Protocol (HTTP) server for responding to requests from external browser programs, a transaction processing system having transaction services for providing access to respectively coupled databases, each service capable of respectively performing selectable predetermined functions, wherein function requests and function results are communicated in buffers having predetermined formats, a method for providing a HTTP interface to a transaction processing system, comprising the steps of:

(a) establishing a hyper-text markup language (HTML) template that is associated with a predetermined function, said HTML template including a service name that identifies a predetermined transaction service, a function name that identifies said function, a predetermined database command field name, and predetermined database data field names;

(b) reading a service name and a function name from a browser request;

(c) allocating memory for a buffer;

(d) reading a command field name, data field names, and associated values from the browser request;

(e) writing at predetermined locations in said buffer said values which were read from the browser request;

(f) initiating the transaction processing system with said service name and the buffer; upon receiving in the buffer a transaction response from the transaction processing system, performing steps (g)–(j);

(g) reading values of the data field names from the buffer;

(h) creating an HTML document from the HTML template;

(i) writing to said HTML document said values from step (a) at locations reserved by respective data field names; and (j) transferring the HTML document to the HTTP server.

23. The method of claim 22, further comprising the step of pre-establishing a predetermined plurality of transaction gateway clients, each for performing steps (b)–(j) for a respective request from a browser program, whereby each said client is ready for processing prior to receipt of a request from a browser program.

24. The method of claim 23, further comprising the step of dynamically initiating gateway link threads by the HTTP server in response to requests from browser programs, each for connecting with an available one of said transaction gateway clients and transferring a request to said available one of said transaction gateway clients.

25. In a data processing system having a HyperText Transport Protocol (HTTP) server for responding to requests from external browser programs, a transaction processing system having transaction services for providing access to respectively coupled databases, each service capable of respectively performing selectable predetermined functions, wherein function requests and function results are communicated in buffers having predetermined formats, a method for providing a HTTP interface to a transaction processing system, comprising the steps of:

(a) establishing a hyper-text markup language (HTML) template that is associated with a predetermined function, said HTML template including a service name that identifies a predetermined transaction service, a function name that identifies said function, a predetermined database command field name, and predetermined database data field names;

(b) establishing a template-to-buffer mapping table which is associated with said function and has mappings of said command field name and said data field names to predetermined offsets into a buffer;

(c) reading a service name and a function name from a browser request;

(d) selecting the mapping table associated with the function name;

(e) allocating memory for a buffer;

(f) reading a command field name, data field names, and associated values from the browser request;

(g) obtaining from said mapping table from said selecting step offsets associated with said database command field name and said database data field names read from the browser request;

(h) writing at locations respectively indicated by said offsets from said obtaining step said values which were read from the browser request;

(i) initiating the transaction processing system with said service name and the buffer; upon receiving in the buffer a transaction response from the transaction processing system, performing steps (j)–(m);

(j) reading values of the data field names from the buffer as respectively specified by said offsets from said obtaining step;

(k) creating an HTML document from the HTML template;

(l) writing to said HTML document said values from step (a) at locations reserved by respective data field names; and (m) transferring the HTML document to the HTTP server.

26. The method of claim 25, further comprising the step of pre-establishing a predetermined plurality of transaction gateway clients, each for performing steps (c)–(m) for a respective request from a browser program, whereby each said client is ready for processing prior to receipt of a request from a browser program.

27. The method of claim 26, further comprising the step of dynamically initiating gateway link threads by the HTTP server in response to requests from browser programs, each for connecting with an available one of said transaction gateway clients and transferring a request to said available one of said transaction gateway clients.

28. In a data processing system having a HyperText Transport Protocol (HTTP) server for responding to requests from one or more external browser programs coupled to the HTTP server, a transaction processing system having transaction services for providing access to respectively coupled databases, each service capable of respectively performing selectable predetermined functions, wherein the transaction processing system processes transactions of a predetermined type and outputs transaction data in data structures having predetermined formats, the data processing system further including a transaction gateway client capable of translating requests and responses between the HTTP server and the transaction processing system, a method for interfacing the HTTP server with the transaction processing system, comprising the steps of:

pre-establishing a predetermined plurality of transaction gateway clients, whereby each client is ready for processing prior to receipt of a request from a browser program;

pre-establishing static connections between said gateway clients and the transaction processing system, whereby time associated with connecting a transaction gateway client to the transaction processing system to process a request from a browser program is eliminated;

dynamically initiating a gateway link thread by the HTTP server in response to a request from a browser program;

establishing a connection between said gateway link thread and an available one of the gateway clients;

transferring the request from said gateway link thread to said available one of the gateway clients;

translating the request received by said available one of the gateway clients into a transaction of a predetermined type;

initiating the transaction processing system by said available one of the gateway clients with said transaction of a predetermined type, whereby connection time is eliminated by pre-establishing said static connections;

translating transaction data received from the transaction processing system into a predetermined format for the browser program;

returning said transaction data in said predetermined format to said gateway link thread for returning to the browser programs; and disconnecting said gateway link thread from a respectively connected gateway client process after said transaction data in said predetermined format is returned to the gateway link thread, whereby the gateway client is thereafter available to process a subsequent request from a browser program.

29. The method of claim 28, wherein said predetermined format for the browser program is hyper-text markup language.

30. The method of claim 29, wherein said predetermined transaction type is an Open/On-Line Transaction Processing (Open/OLTP) style transaction.

31. In a data processing system having a memory and having a HyperText Transport Protocol (HTTP) server for responding to transaction requests from external browser programs, a transaction processing system having transaction services for providing access to respectively coupled databases, each of the transaction services for receiving ones of the transaction requests and associated transaction data from the external browser programs in a predetermined first format as specified in an associated web-view file associated with the transaction service, each transaction service further for returning transaction results in the predetermined first format to be provided to a selected one of the external browser programs in a predetermined second format as specified in an associated template file associated with the selected one of the external browser programs, a method for providing an HTTP interface to a transaction processing system, comprising the steps of:

(a) reading transaction data and a transaction service name identifying an identified transaction service from a transaction request received from one of the external browser programs;

(b) reading an associated web-view file for said identified transaction service;

(c) translating said transaction data from said step (a) into a predetermined first format specified by said associated web-view file for said identified transaction service; and (d) providing said translated transaction data to the transaction processing system for processing by said identified transaction service.

32. The method of claim 31 and further comprising the steps of:

(e) receiving transaction results provided by the transaction processing system, said transaction results being provided in a results buffer in the memory and being the results of said transaction request of said step (a) as processed by said identified transaction service;

(f) reading an associated template file for said identified transaction service;

(g) translating said received transaction results into an associated predetermined second format specified by said associated template file read in said step (f); and (h) providing said translated transaction results to the HTTP server.

33. The method of claim 32 wherein said transaction results received in said results buffer includes one or more data fields each containing associated data signals, wherein said associated web-view file maps each of said one or more data fields to an associated address offset value in said results buffer, and wherein said receiving step (e) comprises the step of reading, for each of said one or more data fields, said associated data signals from an associated address in said results buffer as determined by said associated address offset value.

34. The method of claim 33 wherein said template file includes an associated document address offset value for each of said one or more data fields, and wherein said translating step (g) comprises the steps of:

(g1) creating a document in the memory having a predetermined format; and (g2) writing said associated data signals for each of said one or more data fields to a location in said document as determined by said associated document address offset value.

35. The method of claim 34 wherein said document is in the form of an HyperText Markup Language (HTML) document.

36. The method of claim 31 wherein said transaction data includes multiple data fields each containing associated data signals, wherein said associated web-view file maps each of said multiple data fields to an associated address offset value, and wherein said translating step (c) comprises the steps of:

(c1) allocating memory to be used as a view buffer;

(c2) writing said associated data signals associated with each of said multiple data fields to a predetermined location within said view buffer as determined by said associated address offset value.

* * * * *